US007429407B2

(12) United States Patent
Torben-Walter et al.

(10) Patent No.: US 7,429,407 B2
(45) Date of Patent: Sep. 30, 2008

(54) PROCESS FOR COATING SMALL BODIES, INCLUDING TABLETS

(75) Inventors: Kim Torben-Walter, Columbia, MD (US); Mark Arthur Neidlinger, Columbia, MD (US)

(73) Assignee: Aeromatic Fielder AG, Bubendorf (CH)

( * ) Notice: Subject to any disclaimer, the term of this patent is extended or adjusted under 35 U.S.C. 154(b) by 622 days.

(21) Appl. No.: 10/662,816

(22) Filed: Sep. 16, 2003

(65) Prior Publication Data

US 2004/0131791 A1    Jul. 8, 2004

Related U.S. Application Data

(60) Continuation-in-part of application No. 10/627,914, filed on Jul. 28, 2003, now abandoned, which is a continuation of application No. 09/709,560, filed on Nov. 13, 2000, now abandoned, which is a division of application No. 09/223,311, filed on Dec. 30, 1998, now Pat. No. 6,209,479.

(51) Int. Cl.
*B05D 1/02* (2006.01)
(52) U.S. Cl. .................. 427/424; 427/425; 427/427; 118/300; 118/313
(58) Field of Classification Search .............. 427/421, 427/424, 425, 427; 118/300, 303, 313
See application file for complete search history.

(56) References Cited

U.S. PATENT DOCUMENTS 2,648,609 A    8/1953  Wurster .................. 99/166

(Continued)

FOREIGN PATENT DOCUMENTS

SU    1646591    5/1991    .................. 118/62

(Continued)

OTHER PUBLICATIONS

Zhitomirskii, Z.S., et al., "An investigation of the process of applying protective coatings to tablets from aqueous solutions of polymers in a fluidized-bed apparatus". Pharmaceutical Chemistry Journal, vol. 7, No. 8, Aug. 1973, pp. 521-523. ☐☐.*

(Continued)

*Primary Examiner*—Bret Chen
(74) *Attorney, Agent, or Firm*—Miles & Stockbeidge P.C.; Edward J. Kondracki, Esq.

(57) ABSTRACT

A process for coating bodies comprising:

producing an upward spray of coating fluid by means of a two-fluid nozzle to create a coating zone, and contacting the bodies with the spray of coating fluid in the coating zone; wherein, before contacting the bodies with the spray, providing the bodies with a spinning movement by a central impact of gas jets directed upward to intersect the centerline of the spray; guiding the spinning bodies by the gas jets towards a central position over the two-fluid nozzle, thereby increasing the number of suspended bodies contacting the spray; providing atomization gas to the two-fluid nozzle in an amount less than the one which, after moderation by means of muffling gas, would scatter the bodies in the spray zone; and pneumatically muffling the atomization gas just above the nozzle to reduce the body scattering effect thereof; and further wherein, the bodies are pneumatically transported in the coating zone in a non-fluidized state.

9 Claims, 5 Drawing Sheets

U.S. PATENT DOCUMENTS

| | | | |
|---|---|---|---|
| 3,241,520 A | 3/1966 | Wurster et al. | 118/62 |
| 3,253,944 A | 5/1966 | Wurster | 117/100 |
| 3,386,182 A | 6/1968 | Lippert | 34/364 |
| 3,632,257 A | 1/1972 | Ashizawa | 425/222 |
| 3,822,140 A | 7/1974 | Gyarmati et al. | 427/6 |
| 4,080,927 A | 3/1978 | Brown | 118/716 |
| 4,221,182 A | 9/1980 | Brown | 118/716 |
| 4,338,187 A | 7/1982 | Gartside et al. | 208/127 |
| 4,376,608 A * | 3/1983 | Meyer et al. | 414/217 |
| 4,412,909 A | 11/1983 | Faulkner et al. | 208/407 |
| 4,456,504 A | 6/1984 | Spars et al. | 201/2 |
| 4,479,308 A | 10/1984 | Bertelsen | 34/360 |
| 4,495,163 A | 1/1985 | Nguyen | 423/243.08 |
| 4,749,595 A | 6/1988 | Honda et al. | 427/213 |
| 5,145,650 A | 9/1992 | Huttlin | 422/143 |
| 5,165,908 A * | 11/1992 | Van Slooten et al. | 423/349 |
| 5,395,596 A * | 3/1995 | Winkin et al. | 422/142 |
| 5,399,186 A | 3/1995 | Derrah et al. | 71/64.02 |
| 5,688,843 A | 11/1997 | Inaoka et al. | 523/216 |
| 5,718,764 A * | 2/1998 | Walter | 118/303 |
| 5,968,460 A * | 10/1999 | Eastham et al. | 423/74 |
| 6,224,649 B1 * | 5/2001 | Villarreal-Trevino | 75/444 |
| 6,270,801 B1 * | 8/2001 | Walter | 424/489 |
| 6,436,158 B1 | 8/2002 | Fujikawa et al. | 44/620 |
| 6,492,024 B1 * | 12/2002 | Walter | 428/402 |
| 6,835,355 B2 * | 12/2004 | Guo et al. | 422/139 |
| 7,138,159 B2 * | 11/2006 | Hampden-Smith et al. | 427/376.1 |

FOREIGN PATENT DOCUMENTS

WO  WO 95/20432  8/1995

OTHER PUBLICATIONS

Walter, K.T., Coating of Objects from 3 to 20 mm in a Gas Stream, *4th European Coating Symposium 2001 Proceedings*, 255-260 (2001).

VDI-Warmeatlas, .3. Auflage 1977 page "Lf" Duckverlust in Wirgelschichten, Bearbeiter des Abschnitts Lf:Prof. Dr.-Ing O. Molerus, Erlangen.

Geankoplis, "Transport Processes and Unit Operations", 3d Ed., NJ, pp. 123-127 & 352-353, (1993).

Tobiska, S., et al., Coating Uniformity: Influence of Atomizing Air Pressure, Pharm. Dev. Tech., 8(1), 39-46 (2003).

Tobiska, S., et al., Coating Uniformity and Efficiency in a Bohle Lab-Coater using Oval Tablets, *Eur. J. Pharm. Biopharm.*, 56, 3-9 (2003).

Uniformity of Dosage Units <905>, *United States Pharmacopeia 26/National Formulatory 21*, US Pharmacopeial Convention, Inc., 227-229 (2003).

Hawley, Gessner G., The Condensed Chemical Dictionary, 10th Edition, 1981, Van Nostrand Reinhold Company, pp. 468-469.

Merriam-Webster's Collegiate Dictionary, 10th Edition, Merriam-Webster, Inc., 1998, pp. 73, 335, 338, 1138, 1306.

\* cited by examiner

PROCESS FOR COATING SMALL BODIES, INCLUDING TABLETS

RELATED APPLICATIONS AND PATENTS

The present application is a continuation-in-part of application Ser. No. 10/627,914 filed Jul. 28, 2003, now abandoned which is a continuation of application Ser. No. 09/709,560, filed Nov. 13, 2000, now abandoned which is a division of application Ser. No. 09/223,311, filed Dec. 30, 1998 (now U.S. Pat. No. 6,209,479).

FIELD OF THE INVENTION

The present invention relates to coating of small bodies, including tablets. Herein the term "tablets" is used in a broad sense, comprising, within the pharmaceutical industry, not only proper tablets but also pills and capsules, and in the fertilizer and agro-chemical industry pellets and granules.

Thus, the invention is not limited to any specific industrial area but is applicable in connection with the coating of any type of bodies having mean body sizes in the range from approximately 2 mm to 50 mm, especially from 3 to 30 mm.

Coating operations are also important in several industrial areas other than the above-mentioned, such as in the detergent industry and in the confectionary and food industry as well as in the manufacture of catalysts.

Coatings may be applied to such small bodies for several purposes, e.g. to obtain a desired color or other visual improvements, to obtain a sustained or otherwise controlled release of active ingredients, to protect the bodies against humidity and oxygen from the environment, to increase resistance against abrasion and to prevent dust formation in the particular case of handling tablets.

BACKGROUND OF THE INVENTION

Most tablet and small body coating is still done using the same method as in the last 50 years, i.e. coating in the pan coaters or drum coaters in spite of the fact that these apparatuses have serious drawbacks.

These drawbacks are due to the fact that in both processes only one side of the bodies' surfaces is exposed to a spray of coating liquid at a time. These apparatuses also have the drawback that the inlet temperature of the drying gas has to be lower than the maximally permitted product temperature since the cooling effect from the solution evaporation is not realized in the coating zone. This makes the evaporation capacity of the process gas low, necessitating a low spray rate and resulting in a long process time. The spray rate must be further reduced to prevent the bodies from sticking together on the pan, which fact also decreases the handling capacity.

Because of these drawbacks associated with the pan and drum coaters several processes have been suggested for coating particulate materials or small bodies, such as granulae, pellets or crystals.

The first improvement was the use of a fluidized bed for suspending the product. The coating solution was applied to the product as spraying from the top counter-current to the airflow. In comparison to the pan coater, the drying capacity was increased due to the drying capability of the fluidizing air. However, the inlet temperature of the drying/fluidizing air was limited by the maximally acceptable product temperature since the cooling effect of the coating solution is not realized by the product in a countercurrent coating process.

To improve the efficiency of coating it is suggested in U.S. Pat. No. 2,648,609 (Wurster) to impart a turbulent flow of the drying and suspending air by conducting it through ducts in a rotating disc before introduction below a screen over which pass the tablets being coated. The purpose of using a turbulent air flow was to obtain a tumbling action on the tablets to make the coating thereon more even. By this process the coating liquid was applied cocurrently to the air flow, enabling higher inlet temperatures of the drying air, but the treatment was rather severe to the tablets due to contact between the tablets during their tumbling movement. Besides, the tumbling created by the turbulent flow of drying air was insufficient to ensure an even distribution of the coating spray on all surfaces of each particle.

Moreover, processes involving a proper fluidization of the articles to be coated are less suitable for tablets of the size usual inter alia in the pharmaceutical industry because, given their size and shape, these cannot easily be fluidized. Therefore, the fluidized bed was modified into a so-called spouting bed. In this design, the perforations in the bottom of the bed for the process air are concentrated in one or more locations so that the process air at those points has enough velocity to transport the tablets pneumatically. The spray nozzle is placed in the bottom of the fluid bed at the same place as the perforations. The coating solution is then applied in the same direction as the movement of the tablets, i.e. co-currently. With the process air entering where the spray nozzle(s) are placed and thus having the product, spray droplets and drying air all moving in the same direction, the heat and mass transfer are more efficient. This change in design also permitted the inlet temperature to be higher than the maximum acceptable product temperature because the evaporation heat cooled the product. Although this design was more efficient than the previous designs, it had a rather limited equipment capacity. The product layer thickness was limited because the process air had to keep the tablets spouting. Also there had to be a minimal distance between the nozzles to avoid interference. An apparatus of this design is described in U.S. Pat. No. 4,749,595 (Honda et al.).

Also U.S. Pat. No. 5,145,650 (Huttlin) discloses a fluidized bed apparatus having a plurality of nozzles. Although the area of applicability is indicated as including tablet coating, the apparatus seems most suitable for processing and agglomerating smaller particles. Delicate and friable tablets would be damaged by such a long residence time in the fluidized bed.

U.S. Pat. No. 3,253,944 (Wurster) discloses a process in which the particles to be coated are subjected to a cyclic flow. Instead of the randomness of particle motion characteristic of fluidized beds, a portion of the particles flow upwards, while being sprayed, and the rest of the particles flow downwards. The flow is created by introducing drying and flowing air at different intensity through various parts of the bottom of the drying chamber, for instance by having holes or other perforations distributed in a certain pattern in the bottom. However, it has turned out that the upward flow of particles being sprayed and the downward flow of particles being dried are not easily kept separate and mutual contact between the two particle flows substantially disturbs the process.

A further improvement in coating technology was therefore obtained by introducing a tube or partition located around the perforations where the process air enters and where the spray nozzle is located. Examples of such equipment are described in U.S. Pat. No. 3,241,520 (Wurster et al.). The tube acting as partition solved 2 major problems of the spouting bed: The product layer could be increased because the tube allowed free passage of the coated product and it solved the problem of interference when more spray nozzles were present in the same housing. This equipment turned out to be very suitable for coating relatively small objects, but it was not suitable for coating tablets. This is due to the fact that the free-fall velocity of a tablet is comparatively high, and the process air velocity has to be above this free-fall velocity to transport the tablets pneumatically. However, this high velocity is such that it often damages the tablets, depending on the strength of these.

Another drawback of this equipment is the formation of agglomerates when using sticky coating solutions. Formation of deposits of coating material on the surfaces of the tube is a common problem, and the utilization of the drying capacity of the process air is inadequate. Serious upscaling problems are also inherent in this design.

The agglomeration problem was essentially solved by a new apparatus described in WO 95/20432 (Aeromatic-Fielder AG) in which the process air was imparted a swirling motion already before reaching the bottom plate of the apparatus, and the process air was introduced just around the upward directed nozzle. Although this apparatus involved substantial improvements and was capable of producing more uniform high-quality coatings than other apparatuses it was less suitable for large tablets than for minor objects.

This is partly due to the fact that the object to be coated has to be in a spinning movement when hit by the spray of atomized coating liquid droplets.

In the apparatus described in the above-mentioned WO 95/20432, the particles to be coated are imparted a suitable spin by the shear flow in the process air. However, this method is not suitable for objects of the size of pharmaceutical tablets.

Therefore, there exists a need for a new process and a new apparatus capable of creating the desired fast spin of the object to be coated, particularly when this object is a relatively large tablet or other small body.

Furthermore, the development of new tablet pressing machines and other manufacturing equipment has resulted in a substantial increase of the production capacity thereof and, consequently, there is a need for a concomitant increase in the capacity of coating processes and apparatuses.

There is also an increasing need for processes producing very precise coatings; i.e., wherein all bodies in a batch, or in a lot being treated continuously, receive substantially the same predetermined amount of coating material, and the coating must form a film or layer of even thickness on all surfaces of each body. This is particularly important where a purpose of the coating is to obtain a precise sustained release of, e.g., an active ingredient from a body having received the coating or when the coating in itself comprises an active ingredient. Coating technology is used extensively in the pharmaceutical industry, e.g. for the application of non-functional or functional coats (aesthetic, protective or rate controlling polymer films) and for the deposition of Active Pharmaceutical Ingredients (APIs) onto nonpareils (multi-particulate dosage forms). In addition to efficient techniques for API layering of multiparticulate systems, an accurate method of coating objects 3 to 30 mm in length with APIs is also desired in the pharmaceutical industry as this is the size range of most single-unit solid dosage forms. These include tablets for oral administration and forms for other methods of delivery including human implantation. Existing methods have limitations, e.g. in terms of coating speed and accuracy/uniformity, particularly for the deposition of low dose API onto single-unit tablet dosage forms which requires a greater degree of accuracy than can be achieved using current tablet coating techniques [Walter, K. T. Coating of Objects from 3 to 20 mm in a Gas Stream, $4^{th}$ European Coating Symposium 2001 Proceedings, 255-260 (2001)].

It has turned out that the presence of partitions, such as the tubes used in the embodiments of the above-mentioned U.S. Pat. No. 3,241,520 and WO 95/20432, for tablet coating not only involves problems due to the abrasion of the tablets thereon and the formation of sticky deposits, but also because the construction, using partitions outside which a thick layer of objects to be coated is resting, demands a long residence time for the product resulting in a low production capacity and a long lasting mechanical stress on the tablet.

SUMMARY OF THE INVENTION

The present invention relates to a novel method of coating small objects that enables the uniform coating of objects of sizes between 2 and 50 mm, particularly between 3 and 30 mm with a high degree of accuracy. Employing the method of the invention, Relative Standard Deviations (RSD's) below 2% can be obtained for total coating contents as low as 200 micrograms per object.

The present invention is based on the recognition that it is possible to avoid the above explained drawbacks of the prior art technology and fulfill the specified needs in tablet and small body coating by using special pneumatic means for guiding and controlling the movement of the tablets and/or bodies to be coated and thereby omitting the partitions used in the prior art, and by controlling and guiding the spray of coating liquid by means not hitherto applied in the art.

These special pneumatic means comprise a gas flow introduced with the purpose of influencing the flow path of the atomizing air after the latter has exerted its atomizing action, to decrease the upward lifting effect thereof. The influencing is herein and in the attached claims termed "muffling".

Thus, the invention deals with a non-fluidized bed apparatus for coating tablets and other small bodies, having within a housing at least one coating station comprising a perforated base plate, an upward directed two-fluid nozzle centrally in the base plate, means for providing coating liquid to the nozzle, means for providing atomizing gas to the nozzle and means for providing an upward gas stream through the perforations through the base plate.

The apparatus is characterized in that the upper surface of the base plate is inclined towards the nozzle; the perforations through the base plate are ducts arranged around the nozzle, and the upward imaginary prolongations of the ducts intersect an imaginary center line of the spray to be produced by the nozzle; the apparatus further having means for pneumatically muffling the atomizing gas shortly after the latter has left the nozzle to decrease the upward scattering effect of the gas on the bodies being coated; and the area above the base plate influenced by the spray and the gas flow from the nozzle, from the muffling means and from the perforations is without partition for the bodies to be coated.

The means for pneumatically muffling the atomizing gas currently regarded as most suitable for the purpose and with which most practical experience has been obtained, comprises outlets for gas supply means encircling the two-fluid nozzle, and providing a rotating upward gas flow which meets the upward spreading atomizing gas stream from the two-fluid nozzle and deflects and modifies the stream turning it into a broader swirling flow having reduced upward scattering effect on the bodies being coated.

Very satisfactory results have been obtained when the outlets for gas supply means debouch in an annular cavity encircling the nozzle. By this embodiment the upward swirling flow of muffle gas is forced to merge with the atomizing gas.

However, muffling of the atomizing gas may also be achieved by other means. Although three-fluid nozzles have hitherto been constructed with a view of obtaining a desired gas atmosphere in the atomization zone, it might be possible to modify a three-fluid nozzle in such a way that the gas flow in the outer zone at the nozzle tip obtains a direction partially tangential to the atomizing gas. Thus, the invention also comprises embodiments wherein the means for pneumatically muffling the atomizing gas comprises a mantel surrounding the two-fluid nozzle. That means that in fact a three-fluid nozzle is used. Therefore, the term "two-fluid nozzle" is used herein and in the attached claims as covering not only a two-fluid nozzle proper, but also the central portions of a three-fluid nozzle, viz. the portions delivering the spray liquid and the atomizing gas.

In contrast thereto it is an advantage of the embodiment described above that the muffling and the process air introduced through the ducts are supplied from the same plenum and need no adjustment during the operation.

Further preferred embodiments of the apparatus according to the invention are explained in connection with the description of the drawings below.

The invention also comprises a process for coating tablets and other small bodies by subjecting the tablets to an upward spray of coating liquid produced by a two-fluid nozzle, using an apparatus as described above, such that said tablets or small bodies are not in a fluidized state, which process is characterized in that the tablets or bodies, before meeting the spray, are caused to spin by the acentral impact of gas jets directed upward to intersect an imaginary center line of the spray, and simultaneously and subsequently, the spinning bodies are guided by the gas jets towards a central position over the two-fluid nozzle to increase the number of suspended bodies contacting the spray (up to 1000 bodies per nozzle); the two-fluid nozzle is provided with atomization gas which is adjusted to an amount less than the one which, after moderation by means of muffling gas, would scatter the bodies in the drying zone away from the spray of coating liquid droplets; and the upward bodies scattering effect of the atomizing gas is reduced by the pneumatical muffling thereof just above the nozzle.

Preferred embodiments of the process are defined in the claims and are further illustrated in connection with the description of the drawings below.

DETAILED DESCRIPTION OF THE DRAWINGS

Figure 1:
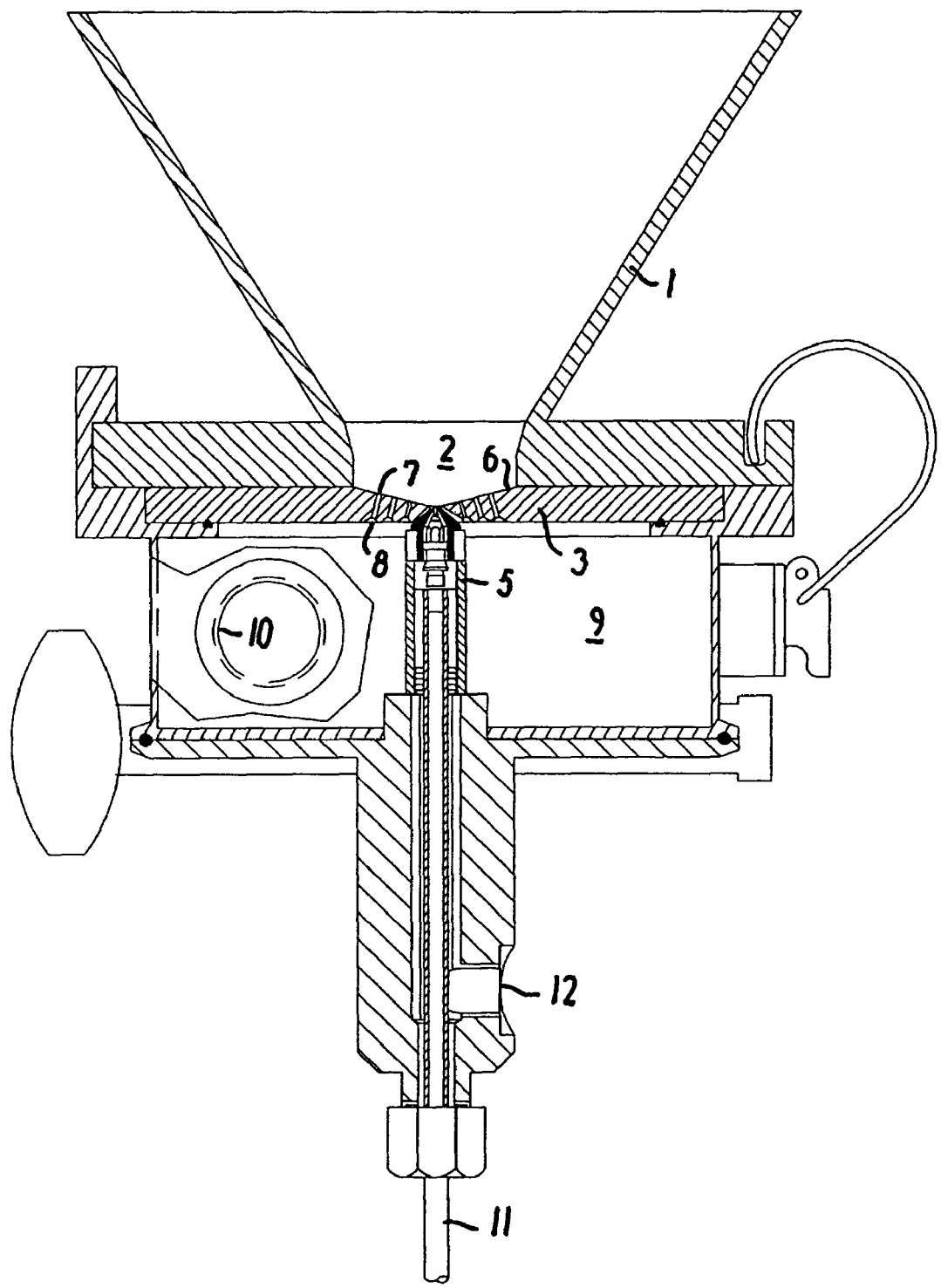
FIG. 1 is a vertical sectional-view of an embodiment of a coating apparatus according to the invention.

In the coating apparatus depicted in FIG. 1 a funnel-like member 1 circumvents a coating zone 2. As depicted, the inner walls of the lower part of the member 1 are, in this preferred embodiment, only slightly conical or even vertical.

Under the zone 2 a base plate 3 is shown.

Figure 2:
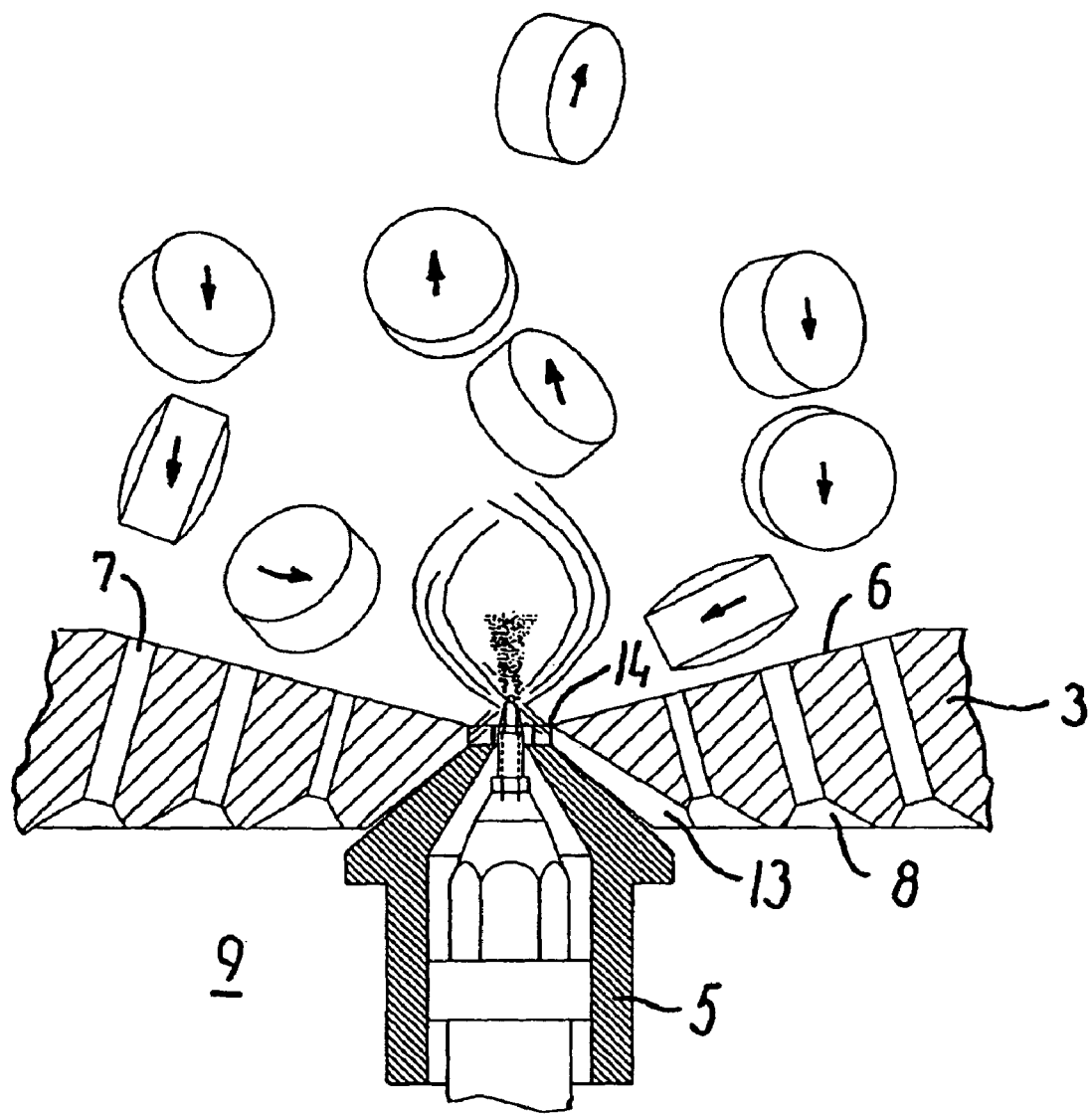
FIG. 2 is an enlarged vertical sectional-view of the central portion of an embodiment of the apparatus according to the invention similar to the embodiment shown in FIG. 1, also showing the flow of tablets being coated.
Figure 3:
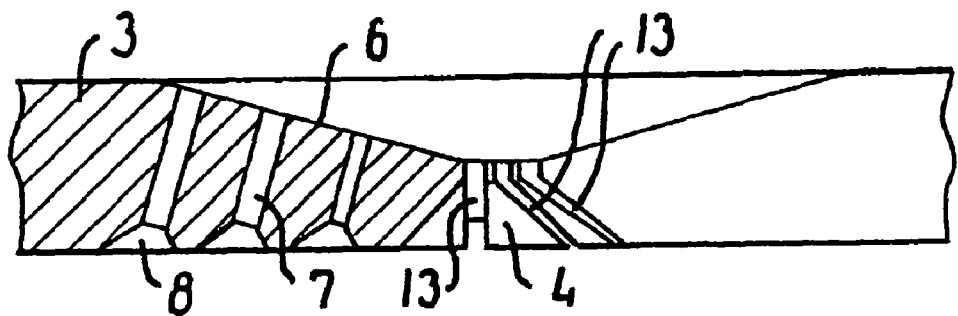
FIG. 3 is a vertical partial sectional-view of a base plate as used in the embodiments of the invention shown in FIGS. 1 and 2.
Figure 4:
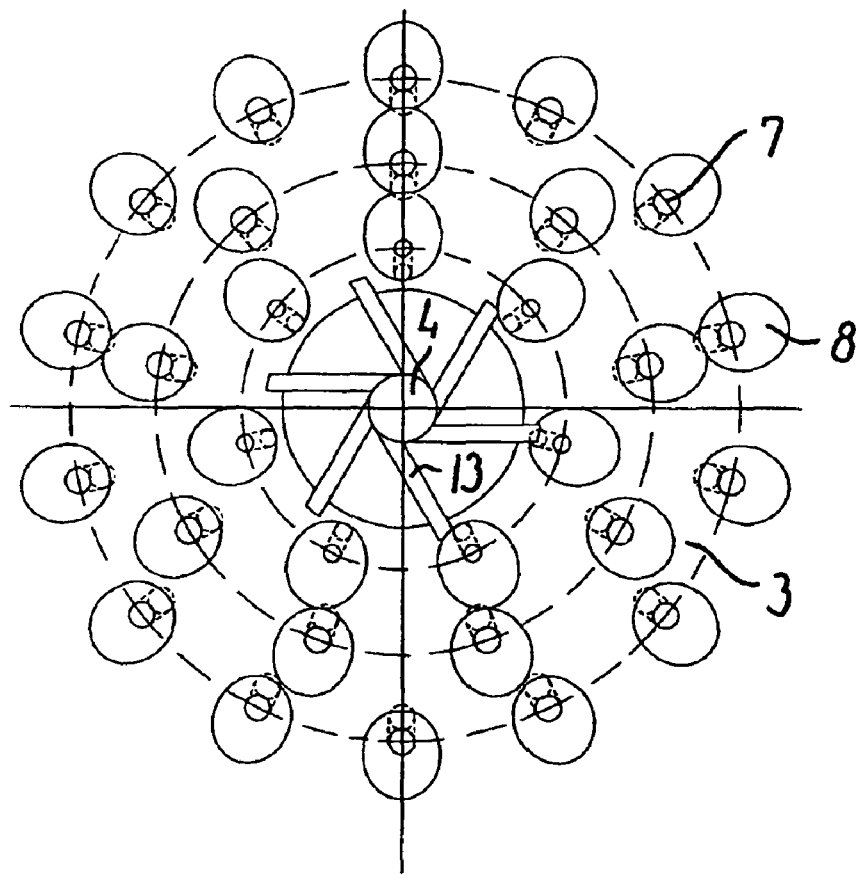
FIG. 4 schematically shows the base plate of FIG. 3 seen from below.
Figure 5:
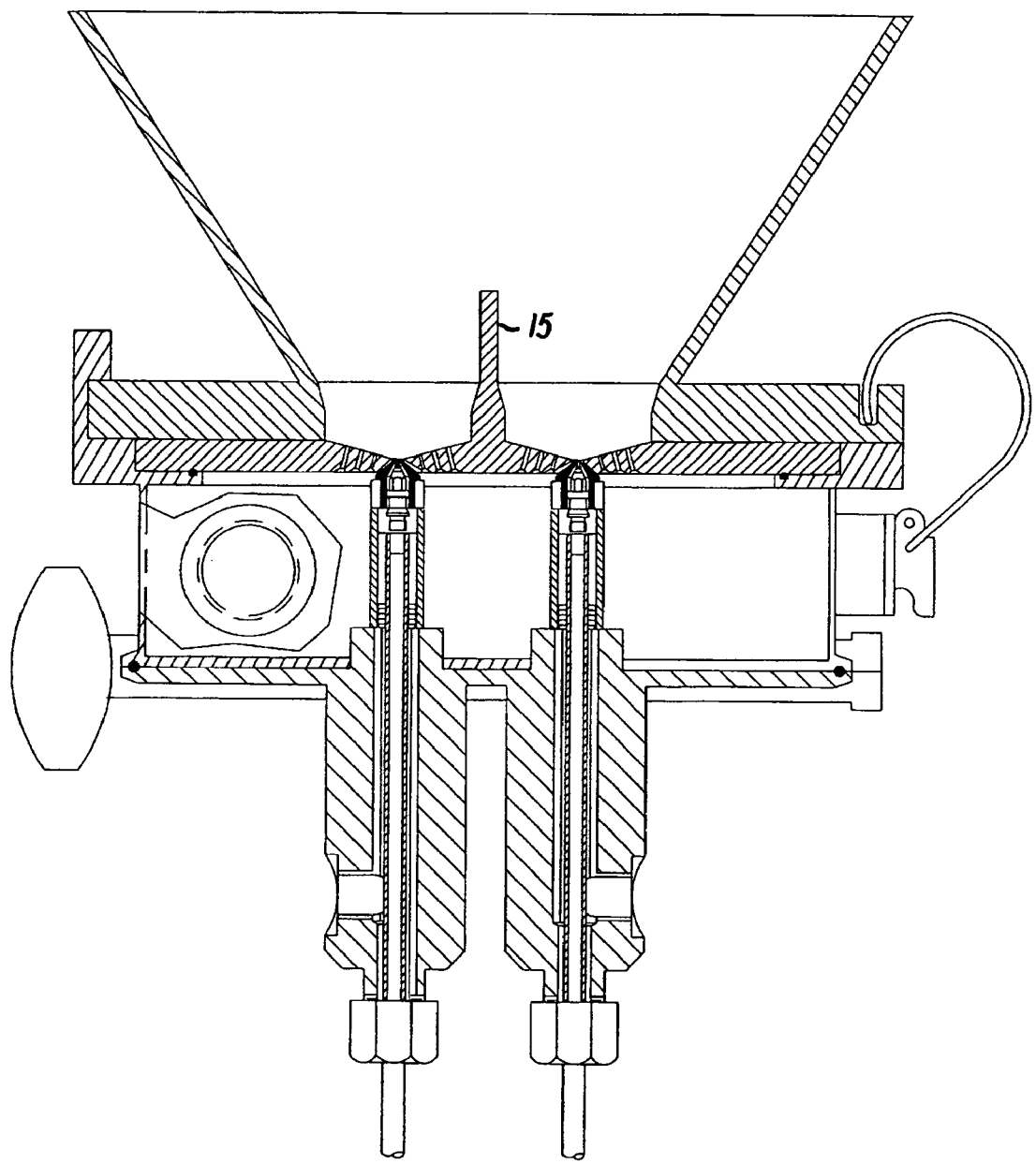
FIG. 5 is a schematically vertical sectional-view of an embodiment of the apparatus according to the invention having more than one treating station.

As it appears most clearly from the FIGS. 3 and 4, the base plate has a hole 4 for accommodating a two-fluid nozzle as indicated by 5 in FIGS. 1 and 2.

It is an important feature of the invention that at least the substantial part of that portion 6 of the upper surface of the base plate 3, which is encircled by the member 1, is inclined downwards against the tip of the nozzle 5 in the hole 4. The inclination of the surface 6 to the horizontal level is preferably 5-20°, more preferably 10-15°. The portion of the plate immediately adjacent to the upper part of the hole 4 may, together with the tip of the nozzle, protrude somewhat upwards (not shown) to avoid depositing of dust in that area.

Another important feature of the invention is the provision of ducts 7 through the base plate 3.

In the preferred embodiments depicted in the figures, those ducts are perpendicular to the inclined surfaces 6. However, their direction may depart somewhat from the one perpendicular to the surface 6; they may for instance be less vertical than shown in the figures, in which case, the inclination of the surface 6 may be somewhat smaller than if the ducts were perpendicular thereto.

Moreover, the ducts 7 are further arranged so that the upward imaginary prolongations intersect an imaginary centerline vertically over the hole 4. Which vertical line is also the imaginary centerline of the spray to be produced by the nozzle 5.

The diameter of the ducts will typically be 1 to 1½ mm and their length not less than three times the diameter.

The ducts may have different diameters to produce jets of different intensity. Thus, the ducts near the nozzle 5 will typically be narrower than those more distant from the nozzle.

The distance between the ducts 7 is selected depending on the size of the tablets (or other types of bodies) to be coated to be from 0.2 to 1.5 times the largest dimension of the tablets (or bodies).

The total area of the ducts 7 plus the area of the outlets 14, described below, typically amount to 3-6% of the horizontal area of the inclined surface 6, preferably approximately 4%.

At the lower surface of the base plate 3 the ducts 7 have funnel-like terminations 8 to obtain a desired flow pattern through the ducts 7.

Below the base plate 3 is a plenum 9 for providing drying air through the ducts 7 and muffling air for controlling the flow of atomizing air from the two-fluid nozzle, as explained in more detail below.

Air is conducted to the plenum through a pipe 10.

The plenum may comprise more than one compartment (not shown), thereby enabling supply of air at various pressures to various groups of ducts 7 and/or means for introducing muffling gas (such as the grooves 13 described below).

The two-fluid nozzle 5 receives coating liquid through conduit 11 and atomizing air through pipe 12 (FIG. 1).

As best seen in FIGS. 2, 3 and 4, the upward tapering conical walls of the hole 4 for accommodating the tip of the two-fluid nozzle 5 is provided with grooves 13 which, when the nozzle is in place, forms ducts leading from the plenum 9 to outlets 14 (FIG. 2) encircling the tip of the nozzle. The depicted embodiment of the apparatus has six such grooves (FIG. 4). The grooves debouch tangentially in relation to the nozzle, for which reason air conducted from the plenum through the grooves to the outlets 14 leaves as an upward swirling flow encircling the nozzle.

The operation of the apparatus is further described with reference to FIG. 2, which also shows the non-fluidized tablet/body flow during the coating process. To fully understand and appreciate the non-fluidized nature of the progress of the tablets/small bodies while practicing the method of the invention, however, a full and complete understanding of the concepts of "pneumatic transport" and "two-phase flow" systems is in order.

Two-phase flows comprise a large segment in the field of fluid mechanics. Two-phase flows are all flows containing two or more substances at different phases such as gas-liquid, gas-solid or solid-liquid. Examples include suspensions (very small particles floating in liquid), boiling water (or other liquid at the phase transition temperature), atmospheric rains (condensations due to saturation as in water here on earth, hydrogen rain on Jupiter, methane rain on Titan, etc.), rainwater seeping down through the earth, extraction of oil from soil, and fluidization. Since the field of "two-phase flows" covers a multitude of different systems, each combination employs its own terminology. Thus, the flow of a gas such as air through a plurality of solid bodies is correctly termed a "two-phase flow". Following is a description of what occurs in the different phases when the process gas and the solid bodies interact.

When the amount of fluid passing through the solid bodies layer is so low that the fluid flows through the voids between each single particle without relocating the particles, the two-phase flow is normally termed a "creeping flow". When the amount of fluid passing through the solid layer is large enough to eliminate the static friction between the particles it is termed "aeration". The effect of "aeration" is that the product layer behaves like a fluid under external forces.

When the amount of gas passing through the product layer is large enough to cause motion between some of the particles, the interaction between the gas and the product layer is appropriately termed, "fluidization". Depending on the particle sizes of the bodies and the particle distribution, the product layer will be fluidized over a range of the process volume flow rate. If the volume flow rate is increased, it is observed that the product layer becomes thicker because the process gas will create voids in the product layer when the gas passes through it. When the fluid bed is fluidized, the product layer looks like a liquid in the boiling stage.

When the amount of fluid passing through the solids layer is increased further, the velocity of the gas leaving the product layer is large enough such that the smaller sized particles are "blown off". This stage in interaction between the gas and the solid is often called "elutriation". During "elutriation" some particles will erupt violently out of the product layer. The product layer still resembles a fluid in the boiling stage, but with larger bubbles.

When the process gas volume flow rate is increased to a level higher than the free fall velocity of all sizes of particles in the product layer, the particles will leave the product layer. This stage of interaction between the gas and the solids is usually called "pneumatic transport". The product layer is no longer in a stable condition, and it is only a matter of time before all particles, large and small, are removed from the product layer. All the particles will not be transported away from the product layer instantly since the process gas can only carry a certain amount of particles per volume unit of gas. Some of the particles will fall back into the product layer and particles which come close to the equipment wall will also fall back due to the lower velocity of the gas near the wall.

The foregoing describes the different stages in interactions between gas and solids. It would be inaccurate to categorize all such interactions as "fluidization" and all systems that enable two-phase interactions as "fluidized beds". Fluidization is merely one of the myriad stages of two-phase systems, depending on the parameters of the contact of the gas flow with the solid bodies. It will be understood and recognized by those skilled in the art that an essential characteristic of "fluidized beds" is that the solids layer has a definable surface. Indeed, many processes are inaccurately described in the prior art as "fluidized bed" processes. Thus, the term has been incorrectly used to describe systems such as those produced in a "Wurster" type apparatus or a fast moving gas stream containing or conveying entrained solids. These are not, however, true or conventional fluidized beds. In a conventional or true fluidized bed the solid particles are kept in a randomly moving fluidized condition by a stream of pressurized gas, which is forced, e.g., through perforations of a support plate, causing the solid particles to move in a random bubbling fashion similar to a gently boiling liquid, but which has a definable surface. These conditions permit the solids to flow and act like liquids and maintain a level like liquids. See "VDI-Wärmeatlas". 3. Auflage 1977 page "Lf 1" Druckverlust in Wirbelschichten, Bearbeiter des Abschnitts Lf: Prof. Dr. Ing O. Molerus, Erlangen; Geankoplis, "Transport Processes and Unit Operations", 3d Ed., NJ, pp. 123-127 & 352-253, (1993) and U.S. Pats. Nos. 5,399,186 and 4,495,163. It is important to emphasize this distinction since true or conventional fluidization causes the solids to flow and act like liquids.

The prior art is of course replete with illustrative demonstrations of the distinctions between "fluidized bed" and "non-fluidized bed" systems and methods. For example, attention is directed to the disclosure in U.S. Pat. No. 4,338,187 which relates to a method for the delivery of particulate solids to a reaction chamber and to internally mixing the particulate solids with a fluid, principally feed, at the reactor. It is desirable to regulate the flow in this system to below +/−5%, preferably below +/−2%. To achieve this close control on solids flow rate, the dampening characteristics of a non-fluidized bed are employed simultaneously with the flow relationships, which are inherent with fluidized bed control systems. The essential feature of the control system is the localized fluidization of the solids just above the conduit inlet. In no instance is the amount of fluidization gas sufficient to fluidize the entire bed of solids in the reservoir. Rather, the amount of gas added is sufficient to only locally fluidize those solids in the region of the conduit inlet. The patent demonstrates the inherently different dynamics associated with "fluidized" and "non-fluidized" systems, respectively.

U.S. Pat. No. 4,412,909 relates to methods and apparatuses for the extraction of oil from a moving bed of carbonaceous material such as oil shale wherein a "non-fluidized" bed of the carbonaceous material is exposed to a plurality of rotatable apertured cylindrical rollers and passing through the moving bed at spaced points a plurality of discrete streams of nonoxidizing gas heated to different temperatures sufficiently high to educe different weight fractions of oil from the shale as vapors into the gas streams; and separating the different weight oil fractions from the gas streams. The patent emphasizes the importance of maintaining "non-fluidized" conditions in the system.

U.S. Pat. No. 4,456,504 relates to a method and apparatus for processing granular solids. The patent discloses an improved method for carrying out the thermal processing of the granular solid in a staged turbulent bed which includes the steps of passing the granular solids downward as a continuous moving body of solids through a reactor vessel and passing a gas upward through the reactor vessel in a generally countercurrent flow to the downward movement of the body of solids at a velocity sufficient to fluidize a first fraction of granules but insufficient to fluidize a second fraction. The crux of the invention resides in the recognition of the different physical mechanisms inherent in non-fluidized systems as opposed to fluidized systems and taking advantage thereof to achieve a particularly desired result not otherwise achievable.

U.S. Pat. No. 4,479,308 relates to a method and system for recovering heat from a hot particulate solid. The particulate solid is treated in a system countercurrently with a gaseous fluid that achieves "fluidization" of only a portion of the particulate solid and leaves a substantial portion thereof non-fluidized. The patent is another example of recognition by the prior art of the critical distinctions that exist between a "fluidized" and a "non-fluidized" system.

U.S. Pat. No. 6,270,801 relates to the processing of a particulate solid in a processing chamber wherein an upwardly flowing gas stream contacts the mass of particulate solid. The patent emphasizes the importance of maintaining "non-fluidization" of the particulate solid. The critical distinctions existing between "fluidized" systems on the one hand and "non-fluidized" systems on the other hand when treating particulate solids are discussed in detail in the disclosure of the patent.

U.S. Pat. No. 5,718,764 discloses a method and apparatus for coating discrete solid particles and discusses the differences that result when conducting such coating operations where the particles are in a "fluidized" state as opposed to a "non-fluidized" state.

In the method of the invention the bodies undergoing coating are not in a true "fluidized" state, i.e., the mass of bodies in the coating chamber do not constitute a true "fluidized bed". Thus, the bodies have no definable product layer and they flow in a ballistic path with no recognizable or defined surface to the mass of bodies in the coating chamber.

A significant advantage of the method of the invention resides in the fact that it enables the coating of an even layer on the bodies, i.e., the deposition of a layer of even thickness on each individual body coated. A further advantage is that the method of the invention enables the even distribution of the coating material over the entirety of the bodies undergoing coating. The ability to create a coating layer of even thickness on bodies is important, particularly where the coat operates as a functional coat, for example, on tablets for sustained release purposes, or as an enteric coat. In addition, the ability of the method of the invention to distribute the coating, e.g., an active ingredient evenly on objects in the 3 to 30 mm range (e.g., under a layer of protective coating) is also very important.

Thus, following the method of the invention, one can distribute the active ingredient on the intended substrates at RSD values as low as 5% or less; in some cases as low as 3% or less.

With regard to the "even distribution" of the coating on the substrates, it is easily demonstrated (e.g., by using a technique that measures variations in the color of the applied coat) that one can obtain full coverage of the intended substrates with less coating material utilizing the method of the invention as opposed to traditional coating techniques.

Although it may be intuitive that a method that creates a coating layer of even thickness necessarily includes the even distribution of the coating material on the bodies undergoing the coating operation, such is not the case. Experience has taught that it is much more difficult to evenly distribute a coat of, e.g., an active ingredient, on bodies than a normal esthetic coat. Normally, when tablets are analyzed after coating with an esthetic coat and an active ingredient coat, larger variations in evenness of distribution are detected with the active coat. It is more difficult to make an even distribution of active drug coat layer than an esthetic coat because of the relative amounts applied and the generally poor film-forming characteristics of active coats.

It is common, of course, to deliver drugs orally. This means that the drug or active must be incorporated in a tablet, pill or capsule, which must be large enough to be picked up from a surface by a human hand, but not so large that it is difficult to swallow.

The first requirement for tablet pressing is that the material be free flowing, which means that the material must be granular. This free flowing capability is essential for achieving the same tablet strength and tablet weight throughout the batch. The transformation of the base formulation into granules is normally carried out in a so-called "wet process". The active drug is either crystalline or amorphous, and both types are problematic when a wet process is used for tabletting. The crystalline drug in a wet process is either in a solid phase or dissolved by the process liquid. When the crystal changes between the solid and the dissolved phase, and back again to the solid phase, the crystal can change form, with the consequence that it may lose activity or create side effects. Sometimes it is necessary to use solvents that are unable to dissolve the crystals. The amorphous drug can be either hydrophilic or hydrophobic, each category creating problems in the granulation process and in the distribution of the active in the pressing material. The requirement for the active distribution from tablet to tablet is normally set by the FDA at ±5%.

When a drug is highly potent, which means only a very small amount of material must be distributed as evenly as possible (the amount of active in the tablets can be as low as 0.05%) significant challenges are presented. Often the accuracy of the distribution can first be determined when the tablets are produced. If the goals are not met, and the active is precious and recoverable, the batch may simply sent for recycling. Manufacturers must go to great lengths to ensure the even distribution of the active to satisfy the FDA demand that the distribution be inside the above-mentioned tolerance.

The problem of even distribution is exacerbated in the case of a particularly potent drug which is difficult to incorporate in the formulation and challenging to recover. According to one method of the prior art, inert tablets were prepared and, after passing the hardness, disintegration and tablet strength tests, small holes were drilled in the tablets and the active drug was placed in the holes and the tablets sealed. The last step in the process is the coating of the tablets. The size and expense of the equipment required for this elaborate procedure is considerable and the handling of tablets laboriously slow. The daily maintenance and adjustment of this equipment is considerable, time consuming and expensive.

The method of the invention is particularly advantageous in solving this problem. Thus, the method of the invention enables the incorporation of very small amounts of active drug on tablets and other small bodies while ensuring an even distribution of the material from body to body.

According to the method of the invention the tablets or small bodies to be coated obtain a spinning movement of high-velocity before reaching the spray of coating liquid and, at the same time, the scattering of the flow of tablets by the atomizing air from the two-fluid nozzle is avoided, for which reason a high concentration of tablets can be maintained in the spraying zone.

This is apparent from a study of FIG. 2 which shows that tablets are falling downwards in the periphery towards the base plate 3. Before touching the plate they obtain a radially inward movement due to the influence of an air flow sucked into the flow above the nozzle and also by the influence of gas jets provided from the plenum 9 through the ducts 7. However, the main effect of these gas jets is to create a fast spinning movement of the tablets before they reach the spray from the nozzle 5. The gas jets blown in through the ducts have a velocity of 80-180 m/sec., preferably 100-150 m/sec.

If no special measures were taken to reduce the scattering effect of the atomizing air from the two-fluid nozzle, the tablets would be blown up at a considerable height and, therefore, the tablets would be spread, which means that only a minor portion of the spray-coating liquid would be deposited on the surfaces of the bodies. Besides, such vigorous flow may damage the particles and increase the abrasion thereof.

The process of the present invention embodies two measures to avoid this disadvantage. Firstly, the amount of atomizing air is reduced compared to the amount normally used for nozzles of the type in question. This means that the droplet size of the spray becomes larger than usual for two-fluid nozzles, but due to the sizes of the tablets this is of no importance as to the quality of the final coating.

Secondly, the momentum of atomizing gas is stifled by muffling gas introduced through the grooves 13 to the outlets 14. In the depicted embodiment, the muffling gas leaves the outlets 14 at substantially the same velocity as the one of the jets from the ducts 7 fed from the same plenum 9. However, when the plenum has more compartments it may be possible to adjust the amount of muffling gas and the amount of gas introduced through the ducts 7 independently. The muffling gas creates a swirling flow that rapidly influences the flow of atomizing air from the nozzle. Therefore, the last-mentioned flow also becomes swirling and, consequently, the upward velocity component and thus the tablet lifting capability becomes lower, whereas the size of the spray cloud becomes somewhat broader This means that the spinning particles passing along the inclining surface of the base plate 3 when reaching the spray only receive a moderately lifting influence and their residence time in the zone where they are hit by the spray droplets is relatively extended. Instead of a muffled two- or three-fluid nozzle another low momentum spray device, e.g. electrostatic or ultrasonic spray means, also being low momentum spray devices, can be considered for use in the apparatus and the process of the invention.

The apparatus and the process according to the invention may be used both for batch-wise and continuous tablet coating.

Apparatuses of both types may comprise one or several coating stations. When more than one coating station is applied, they may be operated either independently as a parallel system or they may be connected in series.

As depicted in FIG. 5 the coating stations may be separated by a wall 15 over which the tablets pass at random when lifted by the coating spray flow.

Passage of tablets from one coating station to another may also be obtained by a controlled permanent or adjustable tilting of the apparatus.

For continuous operation an apparatus according to the invention may typically comprise five coating stations connected in series. Passage from one station to the next is controlled by tilting the battery of stations or by affecting the product container shape such that the tablets can move forward but not backwards through the apparatus. The coating capacity of such a multi-station apparatus will be approximately 3,000 tablets/min. when a coating layer of 20-30 micrometers shall be obtained using an aqueous or organic coating solution. The total treatment time for each tablet for passing all five stations will be approximately 10 sec.

In such a battery of coating stations coating materials of different composition may be applied to obtain a multi-layer coating in only one passage of the tablets through the battery of coating stations.

In commercial use the apparatus according to the invention will of course be provided with equipment for automatic operation based on signals obtained by continuously or periodically monitoring of various parameters, such as flows or temperatures of gasses or tablets introduced or withdrawn from the apparatus or other parameters which will be obvious to a person skilled in the art.

The invention is further elucidated by the following example.

EXAMPLE 1

A coating operation was performed in an apparatus as the one shown in FIG. 1

The size of the apparatus was such that the horizontal diameter of the inclined surface 6 was 40 mm.

The tablets to be coated were circular and had the following dimensions:

diameter . . . 7.0 mm height . . . 4.5 mm surface area . . . 6.6 .times.$10^{-5}$ $m^2$ The weight of each tablet was 0.164 g and the number of tablets in the batch was 200 corresponding to a total weight of 32 g.

The coating liquid was a 20 weight % aqueous solution of Opadry.RTM. YS-1-7003, which is a coating based on hydroxypropyl methyl cellulose.

Ambient Condition:

temperature . . . 19° C.

relative humidity . . . 64%

Inlet temperature of gas introduced to the plenum . . . 108° C.

Flow rate for process gas introduced to plenum 9 . . . 0.00684 $m^3$/sec.

Velocity of process gas through the ducts 7 and the outlets 14 . . . 128 m/sec Atomizing pressure . . . 2.5 bar Atomizing gas flow rate . . . 0.0004 $Nm^3$/sec.

Coating solution spray rate . . . 8.25 g/min.

Process time . . . 40 sec.

Coating thickness . . . 42 μm

The resulting coated tablets were subjected to various examinations and tests. By these no damage of the tablets was observed and the coating was estimated as being of very even thickness and of high-quality.

Several other runs were made employing the apparatus of FIG. 1 to coat tablets and using the process of the invention, and the results obtained thereby indicate that the invention enables a faster coating of each tablet than possible when using any of the commercial coating apparatuses. The method of the invention also enables the coating of tablets that are too delicate or friable to be coated by known commercial processes or apparatuses.

EXAMPLE 2

A study was undertaken to determine the accuracy of the method of the invention in applying small amounts (theoretical doses of 200 and 400 micrograms per tablet) of an active pharmaceutical ingredient (API) onto conventional tablets and to investigate the influence of the following air suspension process parameters on the uniformity and yield of API content per tablet: batch weight, API solution concentration, API dose, solution spray rate and atomizing gas pressure.

Methods of evaluating coating uniformity include mass variance of the coated tablets and variance of the tablet API content [Tobiska, S. and Kleinebudde, P. Coating Uniformity:

Influence of Atomizing Air Pressure, *Pharm. Dev. Tech.*, 8(1), 39-46 (2003); Tobiska, S. and Keinebudde, P. Coating Uniformity and Efficiency in a Bohle Lab-Coater using Oval Tablets, *Eur. J. Pharm. Biopharm.*, 56, 3-9 (2003) and Uniformity of Dosage Units <905>, *United States Pharmacopeia 26/National Formulary* 21, US Pharmacopeial Convention, Inc., 227-229 (2003).

However, at very low active levels mass variance cannot be used as an analysis method [USP, supra]. For this study, the RSD of the API content were used to evaluate the inter-tablet coating uniformity of the coating method of the invention in applying low doses of an API onto conventional tablets.

Granules were prepared using a PRECISION GRANULATOR™ (MP ⅔, Aeromatic-Fielder Ltd.) with 88 wt. % Lactose (Pharmatose 200M, DMV), 5 wt. % Polyvinylpyrrolidone (K29/32, ISP; delivered via a 15 wt. % solution), 5 wt. % Microcrystalline cellulose (Avicel PH-101, FMC) and 2 wt. % Crospovidone (Polyplasdone XL10, ISP). After milling (197S, Quadro Comil; 94R screen; 1500 rpm) and sieving, milled granules <1 mm size were blended with 1% magnesium stearate prior to tabletting in a rotary tablet press (R 190-FT, Courtoy; 7 mm flat-faced, bevelled edged punch and die sets). The uncoated placebo tablets were characterized for weight variation, hardness (PTB 300, Pharmatest) and friability (Electrolab). Tablets were coated with a base coat followed by an API coat (API coat 1 or API coat 2) employing the procedure described in Example 1. Coating formulations and process conditions are given in tables 1 and 2.

TABLE 1

Base and API Coating Formulations

| Material | Base Coat (wt. %) | API Coat 1 (wt. %) | API Coat 2 (wt. %) |
|---|---|---|---|
| Purified water | 94.45 | 94.35 | 93.45 |
| Hydroxypropyl methylcellulose (Methocel E3 PREM LV, Dow) | 5 | 5 | 5 |
| Polyethylene glycol (Carbowax 3350, Union Carbide) | 0.05 | 0.05 | 0.05 |
| Polyvinylpyrrolidone (Plasdone C-15, ISP) | 0.5 | 0.5 | 0.5 |
| Propranolol | 0.0 | 0.1 | 1.0 |

At least 10 coated tablets per batch were analyzed. Methanol (HPLC grade, EM Science) was used as the extraction solvent. The HPLC system (1100 Series, Agilent Technologies) consisted of an autosampler, a quarternary pump, a variable wavelength UV detector and a Base Deactivated Silica C-18 column (5 µm; 150 mm×4.6 mm). The mobile phase was composed of 70% 50 mM phosphate buffer (pH 2.6-2.9): 30% Acetonitrile. All solutions including the sample supernatant were filtered through a 0.45 micron membrane filter (Sartorius). The detection wavelength, injection volume, injection run time and mobile phase flow rate were 292.4 nm, 40 µL, 10 minutes and 1 mL/min, respectively.

Uniformity of Coating Process

Figure 6:
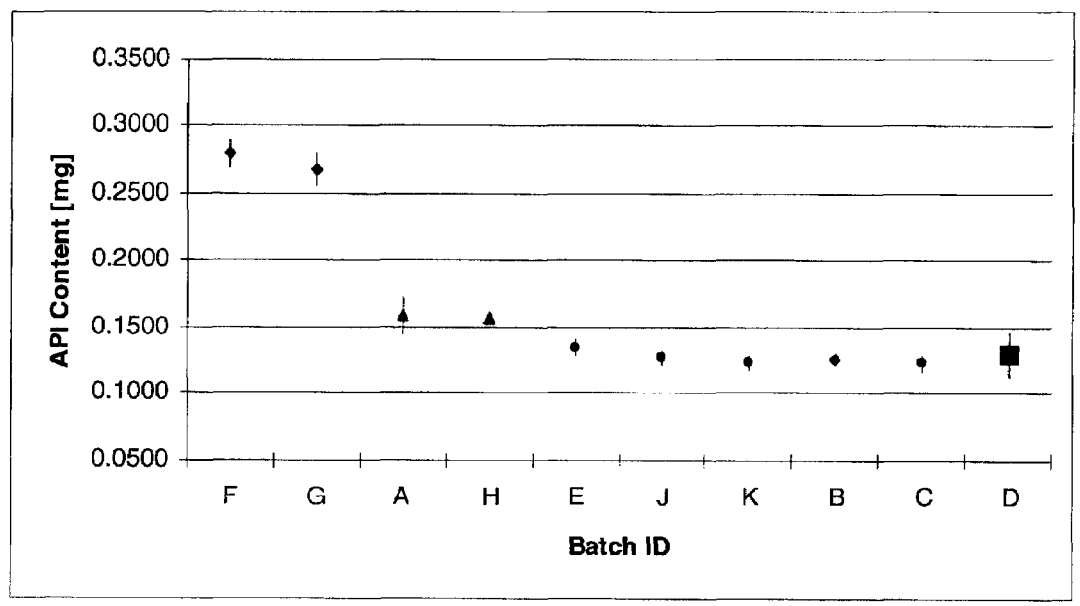

The best results were from Batch H, which had the lowest API content RSD of 3.0% and the second highest API yield of 78.9% (FIG. 6 and table 3). The API content RSDs were 5.0% or less for all but two batches (the causes of these two high values are discussed below).

TABLE 3

API Content RSDs and API Yields

| Batch ID | API Content RSD (%) | API Yield (%) |
|---|---|---|
| F | 3.8 | 70.0 |
| G | 4.6 | 67.1 |
| A | 8.9 | 79.4 |
| H | 3.0 | 78.9 |
| E | 4.9 | 67.3 |
| J | 4.4 | 63.6 |
| K | 4.7 | 61.8 |
| B | 3.8 | 63.1 |
| C | 5.0 | 61.6 |
| D | 13.0 | 65.0 |

Influence of Process Variables on API Content Uniformity and Yield

Batch Weight

The theoretical API dose for both batch weights of 30 g (229 tablets) and 60 g (458 tablets) was 200 micrograms per tablet. Plenum pressure was increased from 1000 cm WC (30 g batches) to 1700 cm WC (60 g batches) to maintain proper tablet movement during coating. From table 3, the two 60 g batches had a significantly higher mean API yield (79.2%)

TABLE 2

Tablet Coating Process Conditions

| Batch ID | Batch Weight (g) | Airflow Rate (CMH) | Inlet Air Temp. °C. | Plenum Pressure (cm WC) | Atomizing Gas Pressure (Bar) | API Solution Concentration (wt. %) | Volume Applied (mL) | Spray Rate (mL/min) |
|---|---|---|---|---|---|---|---|---|
| F | 30.00 | 17.4 | 120 | 1000 | 2.3 | 0.1 | 89.80 | 4.0 |
| G | 30.00 | 17.4 | 120 | 1000 | 3.0 | 0.1 | 89.80 | 6.0 |
| A | 60.00 | 21.3 | 120 | 1700 | 3.0 | 0.1 | 89.80 | 8.0 |
| H | 60.00 | 21.3 | 120 | 1700 | 2.3 | 0.1 | 89.80 | 6.0 |
| E | 30.00 | 17.4 | 120 | 1000 | 2.3 | 0.1 | 44.90 | 6.0 |
| J | 30.00 | 17.4 | 120 | 1000 | 3.0 | 0.1 | 44.90 | 6.0 |
| K | 30.00 | 17.4 | 120 | 1000 | 2.3 | 0.1 | 44.90 | 4.0 |
| B | 30.00 | 17.4 | 120 | 1000 | 3.0 | 0.1 | 44.90 | 4.0 |
| C | 30.00 | 17.4 | 120 | 1000 | 3.0 | 0.1 | 44.90 | 4.0 |
| D | 30.00 | 17.4 | 120 | 1000 | 2.3 | 1.0 | 4.49 | 4.0 | than the 30 g batches (63.5%). With a larger batch size, there is more surface area to collect the liquid droplets, resulting in higher API yields. The trend in API content RSDs is not as clear compared to the yield. Although the 60 g batches had a higher average RSD of 6.0% (vs. 4.6% for the 30 g batches), the API content RSD of batch A is most likely high because the highest spray rate was used for this batch.

API Solution Concentration

Two API solution concentrations were used, 0.1% (API Coat 1) and 1.0% (API Coat 2). To maintain the 200 micrograms theoretical API dose, the total volume of coating solution was decreased by a factor of ten for the batch coated with API Coat 2. Mean API contents (and API yields) of the various batches were found not to be significantly different from each other (FIG. 2). While API solution concentration did not appear to have a significant effect on API yields, the content RSD values indicated that API solution concentration influenced coating uniformity (table 3). The average content RSD of the 0.1% API solution batches was 4.6 while that of the 1.0% API solution batch, at 13.0%, was the highest RSD among all of the batches. With a lower API solution concentration, the API is distributed into a larger volume of coating solution. Deposition of the API onto the tablets then takes place over a longer period of time, resulting in a more random coating process.

API Dose

The spray times for the 400 microgram theoretical API dose batches were twice as long as those for the 200 microgram batches in order to keep all other parameters constant. All batches had API content RSDs less than 5.0% (table 3). The 400 microgram batches had a mean API content RSD of 4.2% while the 200 microgram batches had a mean API content of 4.6%. The 400 microgram batches were observed to have a slightly higher mean API yield.

Solution Spray Rate

Three different spray rates were used, two for each batch size. The maximum spray rate differs for each batch size as drying rate increases with an increased amount of surface area. Therefore the same two spray rates could not be used for both batch sizes. For the 60 g batches, the API content RSD increased significantly when spray rate was increased from 6.0 to 8.0 mL/min (table 3). With a spray rate of 8.0 mL/min, batch A had an RSD of 8.9%, one of only two batches higher than 5.0%. However, large differences in RSDs were not observed for the 30 g batches at the spray conditions used. All 30 g batches with 0.1% API coat solution had RSDs less than or equal to 5.0%. When spray rate was increased from 4.0 to 6.0 mL/min, the API yields of the 30 g batches ranged between 61.6% and 67.3%.

Atomizing Gas Pressure

At the two atomizing gas pressures selected (2.3 and 3.0 bar), all of the API content RSDs were less than or equal to 5.0% and the API yields ranged from 61.6% to 67.3% (table 3).

Based on the results of this study, the coating process of the invention enables one to uniformly apply low doses of APIs to single-unit dosage forms such as pharmaceutical tablets. API content RSDs of less than 5.0% can be achieved for theoretical doses as small as 200 micrograms. The API yields obtained ranged from 61.6% to 79.4%, with the 60 g batches having the highest values. For the purpose of applying low doses of APIs to single-unit dosage forms, the goal is to obtain the lowest API content RSD and the highest API yield. It will be apparent to those skilled in the art that process and formulation may be optimized to further improve the coating uniformity and coating yield in any particular specific application without departing from the principles and spirit of the present invention.

EXAMPLE 3

The procedure of Example 2 was followed in coating a batch of 50 inert cores (8 mm) with a solution of Taxol® (0.25%). The RSD of the uncoated cores was 1.456. The average coating weight gain was 164 micrograms yielding an RSD of less than 2%, more specifically, 1.76%. Thus, according to the method of the invention, coating RSDs substantially equivalent to the RSDs of the substrates to be coated are obtainable.

It will also be understood by those skilled in the art that the method and apparatus of the invention is suitable for the coating of any plurality of small bodies with any suitable active pharmaceutical ingredient (API).

The invention claimed is:

1. A non-fluidized bed process for coating bodies comprising:

producing an upward spray of coating fluid by means of a two-fluid nozzle to create a coating zone, and contacting said bodies with said spray of coating fluid in said coating zone; wherein, before contacting said bodies with said spray, providing the bodies with a spinning movement by a central impact of gas jets directed upward to intersect the centerline of said spray;

guiding the spinning bodies by said gas jets towards a central position over the two-fluid nozzle, thereby increasing the number of suspended bodies contacting the spray;

providing atomization gas to the two-fluid nozzle in an amount less than the one which, after moderation by means of muffling gas, would scatter the bodies in the spray zone; and pneumatically muffling the atomization gas just above the nozzle to reduce the body scattering effect thereof; and further wherein, said bodies are pneumatically transported in said coating zone in a non-fluidized state.

2. A non-fluidized bed process according to claim 1, wherein the muffling of the atomizing gas is accomplished by blowing in muffling gas encircling the nozzle and partially tangential in relation thereto to produce a swirling upward flow encircling the nozzle and influencing the atomizing gas leaving the nozzle, thereby decreasing the upward body lifting and scattering effect thereof.

3. A non-fluidized bed process according to claim 2, wherein said muffling gas is provided through grooves connected to a source of gas also feeding said gas jets impacting a centrally on the bodies.

4. A non-fluidized bed process according to claim 2, wherein the muffling gas is provided through a mantel surrounding the two-fluid nozzle thereby forming a three-fluid nozzle.

5. A non-flu idized bed process according to claim 1, wherein each of the bodies being coated has a maximum dimension of from 2 to 50 mm.

6. A non-iluidized bed process according to claim 1, wherein each of the bodies being coated has a maximum dimension of from 3 to 30 mm.

7. A non-fluidized bed process according to claim 1, wherein the number of bodies being coated simultaneously is less than 1000 per nozzle.

8. A non-fluidized bed process according to claim 1, wherein the gas jets have a velocity of 80-180 m/sec.

9. A non-fluidized bed process according to claim 1, wherein the gas jets have a velocity of 100-150 m/sec.

* * * * *

UNITED STATES PATENT AND TRADEMARK OFFICE
CERTIFICATE OF CORRECTION

PATENT NO. : 7,429,407 B2 Page 1 of 1
APPLICATION NO. : 10/662816
DATED : September 30, 2008
INVENTOR(S) : Kim Torben Walter and Mark Arthur Neidlinger It is certified that error appears in the above-identified patent and that said Letters Patent is hereby corrected as shown below:

Title page, item (75) Please correct inventor's name – "Torben-Walter" should be "Torben Walter".

Column 17, Line 1 – Delete "non-iluidized" and replace with "non-fluidized".

Signed and Sealed this

Eighteenth Day of November, 2008

JON W. DUDAS
*Director of the United States Patent and Trademark Office*